United States Patent Office 3,759,875
Patented Sept. 18, 1973

3,759,875
CURABLE LIQUID PIGMENT COMPOSITION
AND METHOD
James L. Guthrie, Ashton, Md., assignor to
W. R. Grace & Co.
No Drawing. Filed Oct. 12, 1971, Ser. No. 188,608
Int. Cl. C08g 39/00
U.S. Cl. 260—76                                2 Claims

ABSTRACT OF THE DISCLOSURE

The invention disclosed is for a method of preparing a new curable liquid pigment composition which includes a pigment component, a polyester-polyene component having at least two unsaturated carbon-to-carbon bonds disposed at terminal positions on a main chain of the molecule, and a polythiol component containing a multiplicity of pendant or terminally positioned —SH functional groups per average molecule of the polythiol. Upon curing by a free radical generator such as actinic radiation, the curable liquid composition rapidly forms substantially odorless, solid elastomeric films which effectively color and coat a substrate.

---

This invention relates to a method of preparing and applying a new curable liquid pigment composition which includes a pigment component, a polyester-polyene component having a molecule containing at least two unsaturated carbon-to-carbon bonds disposed at terminal positions on a main chain of the molecule, and a polythiol component containing a multiplicity of pendant or terminally positioned —SA functional groups per average molecule. Upon curing by a free radical generator such as actinic radiation, the curable liquid pigment composition rapidly forms odorless, solid, elastomeric films which color and coat a substrate.

It is well known in the art that cure of internally unsaturated polymers may be effected with polythiols, using a free radical generator. However, such polymers, after curing, have not proved to be commercially practical when used as inks, paints, or the like which contain a pigment and which are applied to a substrate as a thin film. Eventually degradation and embrittlement result in prior art compositions substantially reducing their useful service life. Further, most curable prior art compositions have proven to be too expensive for commercial usage.

It has now been found that numerous defects of curable pigment compositions of the prior art may be effectively overcome by practice of the present invention which provides a method for preparing and applying a new curable liquid pigment composition containing a polyester-polyene, a pigment, and a polythiol component. Upon curing by actinic radiation, the present composition forms a solid pigmented resin or elastomer film disposed on a substrate.

The prepared curable composition may be stored safely for long periods of time in the absence of a free radical generator, and upon exposure to a free radical generator, the composition cures rapidly and controllably to a pigmented film which effectively binds to a substrate, withstands even severe weathering conditions, is low in formation when compared with compositions derived from conventional technology.

Generally stated, the present invention provides a curable composition which includes a pigment, a polyester-polyene component and a polythiol component.

The polyester-polyene component may be prepared by reacting a first member having the general formula

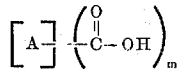

with a second member having the general formula $[B]\!\!-\!\!(OH)_n$, wherein [A] represents polybasic acid, [B] represents polyhydric alcohol, $m$ and $n$ are equal to or greater than 2 and preferably 2 to 4. The reaction product is capped by a third member having the general formula

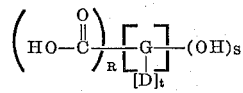

wherein [G] typically represents a saturated alkyl member having a molecular weight from about 100 to about 400, R, and S are numerals from 0 to 10 and preferably 1 with the sum of R and S always equal to or greater than 1, and with $t$ being a numeral from 1 to 10 and preferably from 2 to 8. In another embodiment of this invention, (G) may be absent; the hydroxyl or the carboxyl group may be joined directly to (D). Examples of these materials are allyl alcohol or acrylic acid. Typically, the sums of numerals $m$ and R are approximately equal to the sums of numerals $n$ and S.

In the above formula, member [D] is selected from the group consisting of:

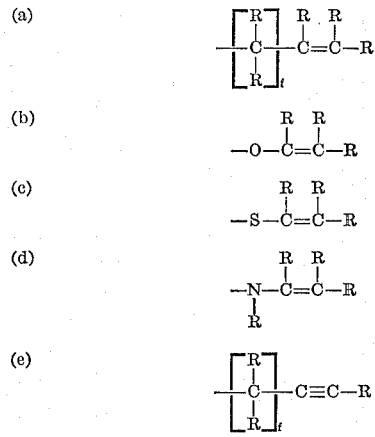

In the groups (a) to (e), $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms.

The polybasic acid used to form the first reactant member may be, for example, succinic acid or succinic anhydried, fumaric acid, maleic acid or maleic anhydride, glutaric acid, adipic acid, phthalic acid or phthalic anhydride, isophthalic acid, terephthalic acid, itaconic acid, trimellitic acid or trimellitic anhydride, and the adduct of levopimaric acid and maleic acid.

The polyhydric alcohol used to form the second reactant member may be, for example, ethylene glycol, diethylene glycol, polyethylene glycol, propylene glycol, dipropylene glycol, polypropylene glycol, 1,3-propanediol, 1,4-butanediol, neopentyl glycol, pentaerythritol, glycerol, trimethylolpropane, Bisphenol A (4,4-Isopropylidenediphenol), 1,4-dihydroxymethylbenzene.

Useful capping agents include, for example, allyl alcohol, trimethylolpropane diallyl ether, diallyl malate, diallyl tartrate, 2-vinyloxyethanol, vinyl hydroxyethyl sulfide, 10-undecylenyl alcohol, N-methyl-N-vinylethanolamine, 4-vinyloxybenzyl alcohol, allyl maleate, allyl phthalate, and diallyl trimellitate.

The polyester-polyene component has a molecular weight in the range from about 64 to 20,000, preferably about 200 to about 10,000, and a viscosity in the range from essentially 0 to 20 million centipoises at 70° C. as measured by a Brookfield Viscometer. The polyester-polyene is characterized by having at least two unsaturated carbon-to-carbon bonds disposed at terminal positions on a main chain of the molecule.

The polythiol component has a molecular weight in the range from about 50 to about 20,000 and the general formula:

$$E(SH)_U$$

wherein E represents a polyvalent organic moiety free from reactive carbon-to-carbon unsaturation and U is at least 2. The ene/thiol mole ratio is selected so as to provide a solid, self-supporting cured product under ambient conditions in the presence of a free radical generator.

The polythiol may be a simple or complex organic compound having a multiplicity of pendant or terminally positioned —SH functional groups per average molecule.

On the average the polythiol must contain 2 or more —SH groups/molecule and have a viscosity range of essentially 0 to 20 million centipoises (cps.) at 70° C. as measured by a Brookfield Viscometer either alone or when in the presence of an inert solvent, aqueous dispersion or plasticizer. Operable polythiols usually have molecular weights in the range about 100 to about 20,000, and preferably from about 200 to about 10,000.

The polythiols may be exemplified by the general formula $R_8$—$(SH)_n$ where $n$ is at least 2 and $R_8$ is a polyvalent organic moiety free from reactive carbon-to-carbon unsaturation. Thus $R_8$ may contain cyclic groupings and hetero atoms such as N, P, or O and primarily contains carbon-carbon, carbon-hydrogen, carbon-oxygen, or silicon-oxygen containing chain linkages free of any reactive carbon-to-carbon unsaturation.

One class of polythiols curable with polyester-polyenes to obtain essentially odorless polythioether products are esters of thio-containing acids of the formula $$HS—R_9—COOH$$

where $R_9$ is an organic moiety containing no reactive carbon-to-carbon unsaturation with polyhydroxy compounds of structure $R_{10}$—$(OH)_n$ where $R_{10}$ is an organic moiety containing no reactive carbon-to-carbon unsaturation, and $n$ is 2 or greater. These components will react under suitable conditions to give a polythiol having the general structure:

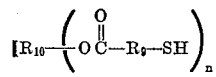

where $R_9$ and $R_{10}$ are organic moieties containing no reactive carbon-to-carbon unsaturation, and $n$ is 2 or greater.

Certain polythiols such as the aliphatic monomeric polythiols exemplified by ethane dithiol, hexamethylene dithiol, decamethylene dithiol, tolylene-2, 4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products may not be widely accepted from a practical, commercial point of view.

Examples of the polythiol compounds preferred because of relatively low odor level include but are not limited to esters of thioglycolic acid (HS—CH₂COOH), α-mercaptopropionic acid (HS—CH(CH₃)—COOH and β-mercaptopropionic acid (HS—CH₂CH₂COCH) with polyhydroxy compounds such as glycols, triols, tetraols, pentaols, hexaols, and the like. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

The term "pigment" as used herein is meant to include those colored organic and inorganic compounds which are normally used to impart color as well as organic dyes which are used for the same purpose. There is no restriction as to pigments or dyes which may be used except that they be non-reactive with components of the present curable composition. Illustrative of the various inorganic pigments are titanium dioxide and carbon black, metallic flakes, powders and dust such as aluminum powder, bronze powder, and the like. Organic pigments and dyes which may be used include for example Ranger Red, Permanent Red 2b, Pthalocyanine blue, Pthalocyanine green, Cadmium Lith primrose yellow, Lithol red, Lithol rubine, Toluidine red, Roluidine yellow, Hansa yellow, Irgazine yellow, Irgazine orange, Irgazine red, Irgazine violet, and the like.

Although the concentration of pigment included in the present composition is not critical, sufficient coloring should be used to provide good covering properties with the desired color strength. While economic factors generally determine the maximum amount of pigment to be used, it should be noted that excessive amounts of pigments may render the composition too viscous for convenient handling or may tend to cause the composition to chalk upon curing. Generally, useful compositions include pigments in an amount 1 to about 30 parts by weight per 100 parts by weight of polyene-polythiol combination although pigment loadings as high as 200 parts on the same basis may be used effectively in some of these compositions. The specific amount of pigment to be used is thus dependent upon the coloring properties of the pigment, properties desired for the cured composition and the like.

The present curable compositions are characterized by insensitivity to visible light, rendering them generally free from setting on for example, apparatus which may be used to apply the composition to a substrate. Upon exposure to actinic light, the present curable compositions are found to be rapidly curable, making them eminently suitable for use and as ink in newspaper printing and other high speed printing operations, paints in assembly operations and the like. A one micron thick film of the present composition, such as may be used in newspaper printing, may be completely cured in as little as 0.8 millisecond period of exposure to actinic light. It is therefore evident that a one-micron thick film of these ink compositions deposited on a newspaper web passing under a 0.32 square inch actinic light exposure area is capable of being completely cured at web speeds even as high as 2000 feet per minute. The ink composition may be photocured using longer periods of exposure, if desired, up to about 15 seconds. Typically, the present compositions are applied to a substrate in a thickness range of about 0.5 to 8 microns, and desirable about 1 to about 3 microns.

The present composition may include modifiers, as desired to achieve a particular advantage. For example, resin or resin ester may be added to improve hardness and mar resistance; phenolic materials may be added to improve water resistance; styrene, vinyltoluene, methyl methacrylate, and acrylonitrile may be added to improve color, gloss and chemical resistance; silicones to improve heat resistance; benzoic acid to improve viscosity; expoxides to improve adhesion; and isocyanates to improve abrasion resistance. It is recognized that some of these modifiers may achieve other advantages, or they may be added in combination to achieve multiple advantages. Other well known modifiers may be used as desired.

The polyene will have two or more reactive unsaturated carbon-to-carbon bonds located terminal from the main chain. The polythiol will have two or more thiol groups per molecule. After the polyene, pigment, and polythiol are combined and if desired, with additional materials, as may be required, the curable composition is exposed to a free radical generator such as actinic radiation to give an essentially odorless solid elastomeric or resinous polymeric product. Although as a practical matter, actinic radiation is preferred, it is recognized that chemical free radical generating reagents may be employed as well as high energy radiation bombardment.

Although the mechanism of the curing reaction is not completely understood, it appears most likely that the curing reaction may be initiated by most any chemical free radical generating reagent which dissociates or abstracts a hydrogen atom from an SH group, or accomplishes the equivalent thereof. Generally the rate of the curing reaction may be increased by increasing the temperature of the composition at the time of initiation of cure. In many applications, however, the curing is accomplished conveniently and economically by operating at ordinary room temperature conditions. Thus, it is possible merely to expose the polyene and polythiol admixture to a chemical free radical generating reagent such as oxygen containing gas and obtain a cured solid elastomeric or resinous product.

By proper choice of type and concentration of free radical generating reagent, the curing period required for conversion of the polyene/polythiol composition from the liquid to the solid state may be varied greatly as desired. In combination with suitable accelerators or retarders, the curing period in the presence of the various chemical free radical generating reagents may vary from less than one second to about 30 days or more. In general, the short curing periods are achieved in applications where thin films of curable composition are required, such as in the field of coatings, whereas the long curing periods are achieved and desired where more massive layers of composition are requried, such as in the field of elastomeric sealants.

A class of actinic light useful herein for curing is ultraviolet light and other forms of actinic radiation which are normally found in radiation emitted from the sun or from artificial sources such as type RS sunlamps, carbon arc lamps, xeron arc lamps, mercury vapor lamps, tungsten halide lamps and the like. Ultraviolet radiation may be used most efficiently if the curable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol curing periods of less than about 1 second duration are possible, especially in thin film applications such as desired herein.

Conventional curing inhibitors or retarders which may be used in order to stabilizes the components of the curable compositions so as to prevent premature onset of curing may include hydroquinone; p-tert.-butyl catechol; 2,6-ditert.-butyl-p-methylphenol; phenothiazine; N-phenyl-2-naphthylamine; inert gas atmospheres such as helium, argon, nitrogen and carbon dioxide; vacuum; and the like.

When a photocuring rate accelerator is present, it may appear as a separate and distinct component such as azobenzene, as a mixture of two or more separate components, such as benzophenone; benzathrone; anthrone, and dibenzosuberone; carbon tetrachloride and phenanthrene; and the like, or in a chemically combined form within the molecular structure of either the polyene or the polythiol. An example of this latter condition wherein the photocuring rate accelerator is present not as a separate component, but rather in a form chemically combined within the polyene component is the following structure which contains four reactive carbon-to-carbon unsaturated groupings and one diaryl ketone grouping per average molecule:

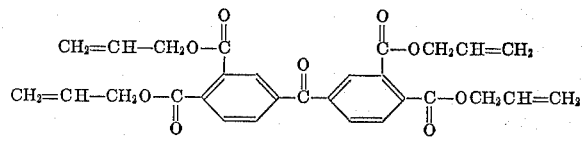

It is further understood that the polyene, the polythiol or the photocuring rate accelerator may be formed in situ in the photocurable composition without departing from the spirit of this invention.

Specifically useful herein are chemical photocuring rate accelerators such as benzophenone, acetophenone,
acenapthene-quionone,
o-methoxy benzophenone,
thioxanthen-9-one,
xanthen-9-one,
7-H-benz [de] anthracen-7-one,
dibenzosuberone,
1-napthaldehyde,
4,4'-bis (dimethylamino) benzophenone,
fluorene-9-one,
1'-acetonaphthone,
2'-acetonapththone,
anthraquinone,
1-indanone,
2-tert.-butyl anthraquinone,
valerophenone,
hexanophenone,
8-phenylbutyrophenone,
p-mor pholinopropiophenone,
4-morpholinobenzophenone,
4'-morpholinodeoxybenzoin
p-diacetylbenzene,
4-aminobenzophenone,
4'-methoxyacetophenone,
benzaldehyde,
α-tetralone,
9-acetylphenanthrene,
2-acetylphenanthrene,
10-thioxanthenone,
3-acetylphenanthrene,
3-acetylindole 1,3,5-triacetylbenzene, and the like including blends thereof, to greatly reduce the exposure times.

The curing rate accelerators are usually added in an amount ranging from about 0.0005 to about 50% by weight of the photocurable composition, with a preferred range being from about 0.05 to about 25% by weight. Preferred photocuring rate accelerators are the aldehyde and ketone carbonyl compounds having at least one aromatic nucleus attached directly to the

group.

To obtain the maximum strength, solvent resistance, creep resistance, heat resistance and freedom from tackiness, the reaction components consisting of the polyenes and polythiols are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable.

The compositions to be cured, i.e., (converted to solid resins or elastomers) may, if desired, include such additives as antioxidants, accelerators, inhibitors, activators, fillers, antistatic agents, flame-retardant agents, thickeners, thixotropic agents, surface-active agents, viscosity modifiers, extending oils, plasticizers, tackifiers and the like within the scope of this invention. Such additives are usually preblended with the polyene or polythiol components prior to or during the compounding step. Operable fillers include natural and synthetic resins, glass fibers, wood flour, clay, silica, alumina, carbonates, oxides, hydroxides, silicates, glass flakes, glass bead borate, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.0005 to about 300 parts on the same basis.

The mole ratio of ene/thiol for preparing the curable composition is from about 0.2/1 to about 5/1, and desirably about 0.75/1 to about 1.5/1.

Practice of the present invention is more fully illustrated by the following examples wherein all parts and percentages are by weight unless otherwise indicated.

EXAMPLE 1

742 g. (7 moles) of diethylene glycol and 1184 g. (8 moles) of phthalic anhydride were heated in a vessel for three hours at 190° C. Next, 428 g. (2 moles) of trimethylolpropane diallyl ether was added and the temperature of the reactants was increased to 230° C. with heating maintained at this temperature for about two hours. The product was cooled and discharged from the vessel. Analysis of the product found it to be a tetraene having a functionality of 4 with a molecular weight of 2210. Curable printing ink was prepared with this tetraene product by combining it with 488 g. of pentaerythritol tetrakis (3-mercaptopropionate), 2800 g. of titanium dioxide, 5 g. Ionol, and 50 g. benzophenone. The prepared ink was printed onto steel can body stock using conventional techniques except modified by exposure of the printed paper to ultra-violet light using a type RS sunlamp. The impressions printed and photocured were found to be characterized by high gloss, good color strength and excellent permanence.

EXAMPLE 2

848 g. (8 moles) of diethylene glycol, 1184 g. (8 moles) of phthalic anhydride, and 192 g. (1 mole) trimellitic anhydride were heated in a vessel for three hours at 190° C. Next, 642 g. (3 moles) of trimethylolpropane diallyl ether was added and the temperature of the reactants was increased to 250° C. with heating maintained at this temperature for about two hours. The product was cooled and discharged from the vessel. The product having a functionality of 4 was formulated as a curable printing ink by combining it with 732 g. of pentaerythritol tetrakis (3-mercaptopropionate), 3600 g. of titanium dioxide, 6 g. Ionol, and 60 g. benzophenone. The prepared ink was printed onto newsprint paper using conventional techniques except modified by exposure of the printed paper to ultra-violet light using a type RS sunlamp.

EXAMPLE 3

530 g. (5 moles) of ethylene glycol, 888 g. (6 moles) of phthalic anhydride, 292 g. (2 moles) of adipic acid, and 58 g. (1 mole) of allyl alcohol were heated in a vessel for three hours at 200° C. Next, 214 g. (1 mole) of trimethylolpropane diallyl ether was added and the temperature of the reactants was increased to 230° C. with heating maintained at this temperature for about two hours. The product was cooled and discharged from the vessel. The product having a functionality of 4 was formulated as a curable printing ink by combining it with 488 g. of pentaerythritol tetrakis (3-mercaptopropionate), 580 g. of phthalocyanine blue, 6 g. Ionol, and 60 g. benzophenone. The prepared ink was printed onto newsprint paper using conventional techniques except modified by exposure of the printed paper to ultra-violet light. The impressions printed and photocured were found to be characterized by high gloss, good color strength and excellent permanence.

EXAMPLE 4

136 g. (1 mole) of pentaerythritol, 848 g. (8 moles) of diethylene glycol, 1332 g. (9) moles of phthalic anhydride, 294 g. (3 moles) of maleic anhydride and 232 g. (4 moles) allyl alcohol were heated in a vessel. When the reaction was completed, the polyene so prepared was cooled and discharged from the vessel. This polyene having a functionality of 4 was formulated as a curable printing ink by combining it with 488 g. of pentaerythritol tetrakis (3-mercaptopropionate), 3400 g. of titanium dioxide, 6 g. Ionol, and 60 g. benzophenone. The prepared ink was printed onto newsprint paper using conventional techniques except modified by exposure of the printed paper to ultra-violet light. The impressions printed and photocured were found to be characterized by high gloss, good color strength and excellent permanence.

EXAMPLE 5

304 g. (4 moles) of propylene glycol, 424 g. (4 moles) of diethylene glycol, 248 g. (4 moles) of ethylene glycol, 1036 g. (7 moles) of phthalic anhydride, 876 g. (6 moles) adipic acid and 428 g. (2 moles) of trimethylolpropane diallyl ether were heated in a vessel maintained under a nitrogen atmosphere and equipped with a condenser, stirrer, thermometer and gas inlet and outlet. The reaction was continued for 10 hours at 140° C. with stirring. Thereafter the nitrogen atmosphere was removed and the kettle was evacuated for 22 hours at 100° C. When the reaction was completed, the polyene so prepared was cooled and discharged from the vessel. This polyene having a functionality of 4 was formulated as a curable printing ink by combining it with 424 g. of pentaerythritol tetrakis (3-mercaptopropyl ether), 840 g. of phthalocyanine blue, 8 g. Ionol, and 80 g. benzophenone. The prepared ink was printed onto steel can body stock using conventional techniques except modified by exposure of the printed paper to ultra-violet light. The impressions printed and photocured were found to be characterized by high gloss, good color strength and excellent permanence.

EXAMPLE 6

186 g. (3 moles) ethylene glycol, 219 g. (3 moles) of propylene glycol, 1022 g. (7 moles) of adipic acid, were heated in a vessel for six hours at 170° C. Next, 428 g. (2 moles) of trimethylolpropane diallyl ether was added and the temperature of the reactants was increased to 230° C. with heating maintained at this temperature for about two hours. The product was cooled and discharged from the vessel. The polyene was formulated as a curable printing ink by combining it with 488 g. of pentaerythritol tetrakis (3-mercaptopropionate), 500 g. phthalocyanine blue, 5 g. Ionol, and 50 g. benzophenone. The prepared ink was printed onto newsprint paper using conventional techniques except modified by exposure of the printed paper to ultraviolet light using a type RS sunlamp. The impressions printed and photocured were found to be characterized by high gloss, good color strength and excellent permanence.

EXAMPLE 7

848 g. (8 moles) of diethylene glycol, 384 g. (2 moles) of trimellitic anhydride, and 686 g. (7 moles) of maleic anhydride were heated in a vessel for five hours at about 170° C. Next, 856 g. (4 moles) of trimethylolpropane diallyl ether was added and the temperature of the reactants was increased to 240° C. with heating maintained at this temperature for about two hours. The product was cooled and discharged from the vessel. The polyene so prepared was formulated as a printing ink by combining it with 1064 g. of trimethylolpropane tris (3-mercaptopropionate), 3800 g. of titanium dioxide, 6 g. of Ionol, and 60 g. benzophenone. The prepared ink was printed onto steel can body stock using conventional techniques except modified by exposure of the printed paper to ultra-violet light using a type RS sunlamp. The impressions printed and photocured were found to be characterized by high gloss, good color strength and excellent permanence.

EXAMPLE 8

1590 g. (15 moles) of diethylene glycol, 1184 g. (8 moles) of phthalic anhydride, 784 g. (8 moles) of maleic anhydride, and 116 g. (2 moles) of allyl alcohol were heated in a vessel for eight hours at about 200° C. The product was cooled and discharged from the vessel. The polyene so prepared was formulated as a printing ink by combining it with 244 g. of pentaerythritol tetrakis (3-mercaptopropionate), 650 g. of phthalocyanine blue, 7 g. Ionol, and 70 g. benzophenone. The prepared ink was printed onto newsprint paper using conventional techniques except modified by exposure of the printed paper to ultra-violet light using a type RS sunlamp. The impressions printed and photocured were found to be characterized by high gloss, good color strength and excellent permanence.

EXAMPLE 9

954 g. (9 moles) of diethylene glycol, 304 g. (4 moles) of propylene glycol, 1036 g. (7 moles) of phthalic anhydride, and 1022 g. (7 moles) of adipic acid were heated in a vessel for four hours at about 200° C. Next, 428 g. (2 moles) of trimethylolpropane diallyl ether was added and the temperature of the reactants was increased to 235° C. with heating maintained at this temperature for about two hours. The product was cooled and discharged from the vessel. The polyene so prepared was formulated as a printing ink by combining it with 488 g. of trimethylolpropane tris (3-mercaptopropionate), 3800 g. of titanium dioxide, 6 g. Ionol, 60 g. benzophenone. The prepared ink was printed onto newsprint paper using conventional techniques except modified by exposure of the printed paper to ultra-violet light using a type RS sunlamp. The impressions printed and photocured were found to be characterized by high gloss, good color strength and excellent permanence.

EXAMPLE 10

248 g. (4 moles) ethylene glycol, 954 g. (8 moles) of diethylene glycol, 1332 g. (9 moles) of phthalic anhydride, 490 g. (5 moles) of maleic anhydride were heated in a vessel for three hours at 170° C. Next, 428 g. (2 moles) of trimethylolpropane diallyl ether was added and the temperature of the reactants was increased to 230° C. with heating maintained at this temperature for about two hours. The product was cooled and discharged from the vessel. The polyene was formulated as a curable printing ink by combining it with 532 g. of trimethylolpropane tris (3-mercaptopropionate), 3800 g. of titanium dioxide, 6 g. Ionol, and 60 g. benzophenone. The prepared ink was printed onto newsprint paper using conventional techniques except modified by exposure of the printed paper to ultra-violet light using a type RS sunlamp. The impressions printed and photocured were found to be characterized by high gloss, good color strength and excellent permanence.

EXAMPLE 11

228 g. (7 moles) ethylene glycol, 434 g. (8 moles) of propylene glycol, 2044 g. (14 moles) of adipic acid, and 412 g. (2 moles) of allyl phthalate were heated in a vessel for ten hours at 185° C. The product was cooled and discharged from the vessel. The polyene was formulated as a curable printing ink by combining it with 244 g. of pentaerythritol tetrakis (3-mercaptopropionate), 670 g. phthalocyanine blue, 7 g. Ionol, and 70 g. benzophenone. The prepared ink was printed onto steel can body stock using conventional techniques except modified by exposure of the printed paper to ultra-violet light. The impressions printed and photocured were found to be characterized by high gloss, good color strength and excellent permanence.

EXAMPLE 12

228 g. (7 moles) ethylene glycol, 434 g. (3 moles) of propylene glycol, 2044 g. (14 moles) of adipic acid, 384 g. (2 moles) of trimellitic anhydride, and 232 g. (4 moles) of allyl alcohol were heated in a vessel for three hours at 200° C. The product was cooled and discharged from the vessel. The polyene was formulated as a curable printing ink by combining it with 488 g. of pentaerythritol tetrakis 3-mercaptopropionate), 770 g. phthalocyanine blue, 5 g. Ionol, and 50 g. benzophenone. The prepared ink was printed onto newsprint paper using conventional techniques except modified by exposure of the printed paper to ultra-violet light. The impressions printed and photocured were found to be characterized by high gloss, good color strength and excellent permanence.

EXAMPLE 13

450 g. (5 moles) of 1,4-butanediol and 888 g. (6 moles) of phthalic anhydride were heated in a reaction vessel for three hours a 175° C. Next 428 g. (2 moles) of trimethylolpropane diallyl ether was added and the reaction continued for 4 hours at 220° C. The product polyene was recovered and was formulated as a photocurable printing ink by combining it with 488 g. of pentaerythritol tetrakis (3-mercaptopropionate), 500 g. phthalocyanine blue, 5 g. Ionol, and 50 g. benzophenone. The prepared ink was printed onto newsprint paper using conventional techniques except modified by exposure of the printed paper to ultraviolet light. The impressions printed and photocured were found to be characterized by high gloss, good color strength and excellent permanence.

EXAMPLE 14

900 g. (10 moles) of 1,4-butanediol, 1332 g. (9 moles) of phthalic anhydride, and 412 g. (2 moles) of allyl phthalate were heated in a reaction vessel for six hours at 185° C. The product polyene was recovered and was formulated as a photocurable printing ink by combining it with 244 g. of pentaerythritol tetrakis (3-mercaptopropionate), 2800 g. of titanium dioxide, 50 g. benzophenone. The prepared ink was printed onto steel can body stock using conventional techniques except modified by exposure of the printed paper to ultra-violet light. The impressions printed and photocured were found to be characterized by high gloss, good color strength and excellent permanence.

EXAMPLE 15

540 g. (6 moles) of 1,4-butanediol, 318 g. (3 moles) of diethylene glycol, 1036 g. (7 moles) of phthalic anhydride, and 294 g. (3 moles) of maleic anhydride were heated in a reaction vessel for three hours at 175° C. Next, 428 g. (moles) of tri-methylolpropane diallyl ether was added and the reaction continued for 4 hours at 220° C. The product polyene was recovered and was formulated as a photocurable printing ink by combining it with 464 g. of pentaerthythritol tetrakis (3-mercaptopropyl ether), 3000 g. of titanium dioxide, 5 g. Ionol, and 50 g. benzophenone. The prepared ink was printed onto newsprint paper using conventional techniques except modified by exposure of the printed paper to ultra-violet light using a type RS sunlamp. The impressions printed and photocured were found to be characterized by high gloss, good color strength and excellent permanence.

What is claimed is:

1. A curable composition which comprises in combination, a pigment, a polyester-polyene component and a polythiol component, the mole ratio being from about 0.2/1 to about 5/1 of ene/thiol, said polythiol having a molecular weight from about 100 to about 20,000, and selected from the group consisting of ethylene glycol bis(thioglycolate), ethylene glycol bis($\beta$-mercaptopropionate), trimethylolpropane tris(thioglycolate), trimethylolpropane tris($\beta$-mercaptopropionate), pentaerythritol tetrakis(thioglycolate) and pentaerythritol tetrakis($\beta$-mercaptopropionate) and polypropylene etherglycol bis($\beta$-mercaptopropionate); said polyester-polyene having a molecular weight in the range from about 200 to about 10,000, and prepared by reacting a polybasic acid selected from the group consisting of succinic acid or succinic anhydride, fumaric acid, maleic acid or maleic anhydride, glutaric acid, adepic acid, phthalic acid or phthalic anhydride, isophthalic acid, terephthalic acid, itaconic acid, trimellitic acid or trimellitic anhydride, with the adduct of levoprimaric acid and maleic acid; with a polyhydric alcohol selected from the group consisting of ethylene glycol, diethylene glycol, polyethylene glycol, propylene glycol, dipropylene glycol, polypropyene glycol, 1,3-propanediol, 1,4-butanediol, neopentyl glycol, pentaerythritol, glycerol, trimethylolpropane, Bisphenol A (4,4-isopropylidenediphenol), and 1,4-dihydroxymethylbenzene; said reaction product being capped by a capping agent selected from the group consisting of allyl alcohol, trimethylolpropane diallyl ether, diallyl maleate, diallyl tartrate, 2-vinyloxyethanol, vinyl hydroxyethylsulfide, 1-undecynyl alcohol, N-methyl-N-vinylethanolamine, 4-vinyloxybenzyl alcohol, allyl maleate, allyl phthalate, and diallyl trimellitate; and wherein the polyester-poyene has a viscosity in the range from essentially 0 to 20 million centipoises at 70° C. as measured by a Brookfield viscometer, with the polyester-polyene having at least two unsaturated carbon-to-carbon bonds disposed at terminal positions on a main chain of the molecule.

2. The composition of claim 1, wherein the ene/thiol mole ratio is about 0.75/1 to about 1.5/1.

References Cited
UNITED STATES PATENTS

| | | | |
|---|---|---|---|
| 3,513,132 | 5/1970 | Edmonds | 260—75 |
| 3,535,193 | 10/1970 | Prince | 161—88 |

MELVIN GOLDSTEIN, Primary Examiner

U.S. Cl. X.R.

106—20, 22; 204—159.18; 260—755, 77